(12) United States Patent
Alberding

(10) Patent No.: US 7,651,750 B2
(45) Date of Patent: Jan. 26, 2010

(54) ARTICLE COMPRISING A TUBE WITH INTEGRAL SHIELD LAYER AND METHOD THEREFOR

(75) Inventor: Mark R. Alberding, Glen Arm, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 619 days.

(21) Appl. No.: 11/380,623

(22) Filed: Apr. 27, 2006

(65) Prior Publication Data

US 2007/0254124 A1    Nov. 1, 2007

(51) Int. Cl.
*B29D 22/00* (2006.01)
*B29D 23/00* (2006.01)
*B32B 1/08* (2006.01)

(52) U.S. Cl. .................. 428/36.91; 428/35.8; 428/36.9; 428/36.3

(58) Field of Classification Search ................. 428/36.9, 428/36.3, 36.6, 36.7, 36.8, 36.91, 35.8
See application file for complete search history.

(56) References Cited

U.S. PATENT DOCUMENTS 6,706,348 B2 * 3/2004 Quigley et al. ............. 428/36.3

FOREIGN PATENT DOCUMENTS

EP           1469098 A2 * 10/2004

* cited by examiner

*Primary Examiner*—Michael C Miggins
(74) *Attorney, Agent, or Firm*—DeMont & Breyer, LLC (57) ABSTRACT

A method is disclosed for forming a hollow tube, wherein the tube has a structural layer and a shield layer. The shield layer forms an inner surface of the tube. In some embodiments of the method, a coating, which forms the shield layer, is applied to a wash-out mandrel. The coating typically comprises a metal and/or a ceramic. A composite material, which in some embodiments is filamentous, is applied to (e.g., wound around, etc.) the coating to form the structural layer. In some embodiments, an optional transitional layer is applied to the coating before applying the composite material to enhance their compatibility. The various layers are cured, and then the mandrel is washed away to create the hollow or bore of the tube.

20 Claims, 6 Drawing Sheets

ARTICLE COMPRISING A TUBE WITH INTEGRAL SHIELD LAYER AND METHOD THEREFOR

FIELD OF THE INVENTION

The present invention relates to tubes for use in severe services, such as launch tubes.

BACKGROUND OF THE INVENTION

Metals possess many desirable properties that make them the material of choice for a variety of applications. But metals are often quite dense and, in applications in which "weight" is of particular concern, it might not be feasible to use metal as fabrication material.

Due to a weight advantage relative to metal, fiber-reinforced composite materials, such as fiberglass, etc., are sometimes used as structural materials for weight-critical applications. But this weight benefit comes at a price; hardware fabricated from composite materials often does not provide the durability (e.g., wear resistance, temperature resistance, etc.) of metal hardware.

Launch-system hardware, such as a launch tube, is an example of an application that requires the performance/durability of a metal but would benefit from the weight advantages of a composite. In fact, metal has historically been used as the construction-material-of-choice for launch tubes. The weight reduction offered by a composite would be desirable, but it might be problematic for a composite launch tube to withstand the physical wear caused by launch of a projectile or the extreme temperatures and erosive character of missile exhaust.

SUMMARY OF THE INVENTION

The present invention provides a way to improve the durability of generally elongate, cylindrical articles, such as tubes, pipes, and the like (hereinafter simply "tubes").

The tubes disclosed herein comprise a structural layer and a shield layer. In some embodiments, the structural layer of the tube is formed from a relatively lightweight material, such as a fiber-reinforced composite material. While this type of material provides the relatively minimal rigidity and strength required, for example, for a launch tube, it is not necessarily capable of withstanding the wear and/or extreme temperatures and/or erosive conditions that prevail, depending upon the launch system (i.e., cold launch or hot launch) within the tube upon launch. That is the purpose of the shield layer.

The shield layer defines the inner surface of the tube and is, therefore, exposed to the environment within the tube's bore. As a consequence, the shield layer is capable of tolerating conditions in the bore and, further, is capable of protecting the structural layer from those conditions. In other words, the shield layer imparts one or more characteristics to the tube that the structural layer does not exhibit, or exhibits in insufficient measure for the intended use of the tube.

For example and without limitation, in various embodiments, the shield layer provides or enhances one or more of the following characteristics:
  wear resistance (e.g., resistance to abrasive or erosive materials, etc.);
  chemical resistance; and
  thermal resistance.

In some embodiments, the shield layer comprises a metal or metallic alloy. In some further embodiments, the shield layer comprises a ceramic. In some additional embodiments, the shield layer comprises both a ceramic and a metal or a metallic alloy.

An aspect of the present invention is a method for making relatively small-diameter versions of the tubes described above. For large-diameter tubes, such as those having a bore with a diameter of greater than about twenty-four inches, equipment can simply be placed within the tube to directly apply (e.g., spray, etc.) the material that forms the shield layer to the inner surface of the tube.

But this large-tube method cannot reliably be used for the relatively smaller-diameter tubes to which the present invention is directed. In particular, for small-diameter tubes, which have inside diameters of about six inches or less, currently-available processing equipment for applying the shield material cannot fit within the tube. For intermediate-size tubes between about six inches and twenty-four inches, to the extent that the spraying equipment can fit with a marginal or relatively small amount of clearance into a relatively long tube, the length of the tube is likely to impede thorough spray coverage of the tube's inner surface. As a consequence, the integrity of the resulting shield layer in such longer tubes will be problematic.

Inserting an "add on" cladding or a discrete liner into a small-bore tube might be suitable for use in some applications. But for launch tubes and other articles in which the straightness and the surface finish of the inner surface are critical considerations, claddings or liners are typically not suitable because of the difficulty in controlling such parameters.

A tube-forming method in accordance with the illustrative embodiment of the invention addresses the scenarios described above in which (1) the diameter of the tube that is being formed is too small to accommodate spraying equipment or (2) the tube is too long to assure the integrity of the resulting shield layer. Scenario (1) pertains to bores having a diameter of about 6 inches or less, regardless of the length of the tube. Scenario (2) applies to tubes having a length that is greater than about 6 feet, if the bore diameter is anything less than about 24 inches.

In a method in accordance with the illustrative embodiment of the present invention, the tube is formed via an open molding process. As used herein, "open molding" refers to a process that uses a male mold, such that the various layers are applied to the outside of the mold.

In a method in accordance with the invention, the material that forms the shield layer is applied during the tube-forming process, rather than after the tube and bore are formed. In fact, the material that will become the shield layer is applied before applying the material that forms the structural layer.

One well-known open-molding process that is suitable for use in conjunction with the present invention is "filament winding." In filament winding, a rotating mandrel (e.g., solid cylinder, etc.) serves as the "male" mold, thereby providing a finished inner surface to the article being formed. This process involves winding resin-impregnated fiber or tape on the surface of the mandrel in a precise geometric pattern. The winding is performed by rotating the mandrel about its longitudinal axis while a delivery head precisely positions fibers on the surface of the mandrel. Filament winding provides a relatively high fiber loading, which provides high tensile strength to hollow articles (e.g., cylindrical tubes, rectangular tubes, etc.).

Some other open-molding processes that are suitable for use in conjunction with the present invention include manual techniques, such as "hand lay-up," wherein fibers, etc., are wrapped about the male mold by hand and "table rolling,"

wherein the male mold is rolled over fibers, etc. that are placed on a table. In view of the present disclosure, those skilled in the art will know how to use these and other open-molding processes to produce the cylinders with integral shield layers that are disclosed herein.

In a method in accordance with the invention, a "wash-out" male mold is formed. A wash-out mold is a mold that is formed partially or wholly of a material that can be readily washed away on exposure to liquid, such as water. Materials suitable for forming the mandrel include, without limitation, sand, plaster, or salt. The reason for using a wash-out mold, as opposed to a conventional mold, will be discussed later in this specification.

In the illustrative embodiment, the wash-out male mold is a wash-out mandrel. After the wash-out mandrel is formed and sized, a material that forms the shield layer is applied to the surface of the wash-out mandrel. In some embodiments, the material is applied via a spray technique. For example, the material can be, without limitation, a metal and/or a ceramic, which can be applied via plasma or thermal spraying. Application of the shield layer is most conveniently performed by spraying the shield-forming material onto the mandrel while the mandrel is being rotated, such as in a mechanized filament-winding process. The filament winding process is readily automated, and is a preferred technique for the implementation of the methods described herein.

An optional transitional layer is then applied to the shield layer. The purpose of the transitional layer is to address any incompatibility between the shield layer and the structural layer. Typical incompatibilities include adhesion issues and a difference in thermal response (due to a difference in thermal expansion coefficients of the layers). In some embodiments, the transitional layer comprises a high-elongation film adhesive, which is wound about the shield layer by rotating the wash-out mandrel, via filament winding or other open-molding techniques.

The material that forms the structural layer is applied over the shield layer (or the transitional layer, when present). In some embodiments, the structural layer comprises a resin-impregnated fiber or tape that is that is wound onto the wash-out mandrel via filament winding or other open-molding techniques.

The various layers are cured at appropriate temperatures. In some embodiments, the shield layer, the transitional layer, and the structural layer are co-cured. After curing is complete, the wash-out mandrel is removed from the cylindrical structure that has been formed. Removal of the mandrel forms a bore in the cylindrical structure.

A conventional mandrel was initially considered for use in conjunction with the illustrative method. But its use was rejected due to a concern that the shield layer might adhere to the mandrel when the mandrel was removed from the finished article. Any such adhesion would disrupt the integrity of the shield layer on the inner surface of newly-formed tube. As a consequence, a wash-out mandrel was employed. Thus, the cylindrical article, with wash-out mandrel intact, is soaked or washed until some or all of the mandrel is washed away, leaving a cylindrical structure and bore with the shield layer intact. The soaking solution is typically water, which is favored for environmental reasons, but other liquids can suitably be used, as a function of the mandrel's composition.

For the illustrative embodiment, the method is used to form a launch tube that offers the weight benefits of a tube formed from composite materials but that also exhibits the durability of a metallic launch tube. It is to be understood that the illustrative embodiment is not intended as a limitation; rather, it is intended to provide context for the invention and is simply one of many possible embodiments thereof. For example, the method described herein can be used to form tubes for use as piston housings (i.e., cylinders), pipes for carrying erosive or corrosive materials, etc.

DETAILED DESCRIPTION

Figure 1:
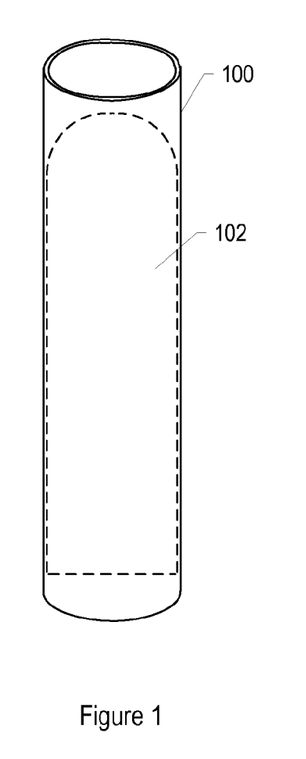
FIG. 1 depicts a launch tube and a projectile, wherein the launch tube comprises a composite material, and further wherein the inner surface of the launch tube comprises a material that improves the durability of the tube in accordance with the illustrative embodiment of the present invention.

FIG. 1 depicts launch tube 100 in accordance with the illustrative embodiment of the present invention. Launch tube 100 contains projectile 102. The projectile, which can be any of variety of different types of ordinance (e.g., mortars, missiles, etc.) can be launched via a cold-launch technology (e.g., electromagnetics, gas bags, etc.) or via a hot-launch technology (e.g., a chemical rocket booster, etc.).

Figure 2:
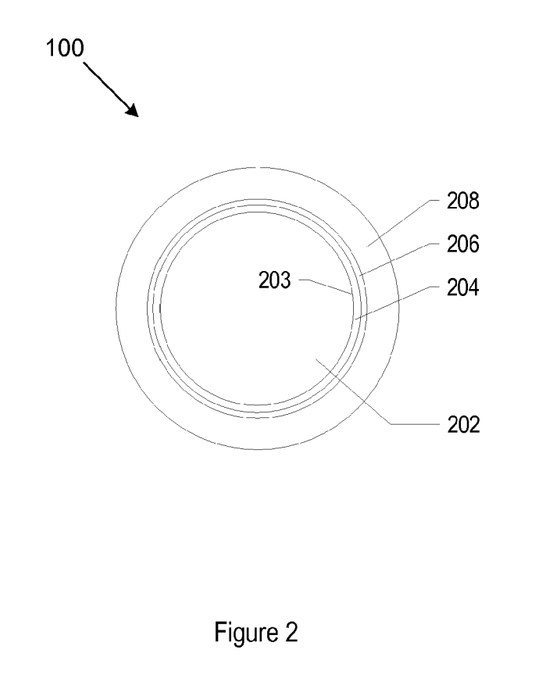
FIG. 2 depicts further details of the launch tube of FIG. 1.

FIG. 2 depicts a cross section of launch tube 100. As depicted in FIG. 2, launch tube 100 includes bore 202 and layers 204 through 208.

Layer 204 is the inner-most layer of tube 100. Surface 203 of layer 204 defines the inner surface of tube 100 and is, of course, exposed to the environment within bore 202. In the context of a hot launch, when projectile 102 fires, bore 202 fills with exhaust gases. The exhaust gases are extremely hot (i.e., in excess of 4500° F. as a function of missile type) and often very erosive. The erosive nature of the exhaust gas is due to the presence of suspended metallic particles. In this case, therefore, layer 204 must be able to withstand the extreme heat and erosive nature of the exhaust.

If, on the other hand, projectile 102 is cold-launched, there might be contact by the projectile or other launch related structures with layer 204 of tube 100. Since such contact has the potential to cause significant wear and attrition, layer 204 must be resistant to such wear.

In fact, to the extent that the other materials that compose launch tube 100 cannot withstand these launch conditions, layer 204 shields or protects them. For this reason, layer 204 is referred to as a "shield" layer.

In the context of the illustrative embodiment, shield layer 204 comprises one or more materials that are suitable for exposure to missile exhaust or wear. For example, in some embodiments, layer 204 comprises one or more metals, such as, without limitation, rhenium, niobium, molybdenum, or tantalum. In some embodiments, layer 204 comprises various metal alloys, such as stainless steel. In some further embodiments, layer 204 comprises a ceramic. In some additional embodiments, layer 204 comprises a combination of a ceramic with a metal or metallic alloy. Other types of materials that are suitable for use as layer 204, as will occur to those skilled in the art after reading the present disclosure, can suitably be used as well.

It is clear that when the tube is to be used for a different application (i.e., other than a launch tube), shield layer 204 might be formed from materials that are different from those mentioned above, as befits the specific application. Those skilled in the art, after reading the present disclosure, will know how to select material suitable for forming the shield layer of a tube for use in different application.

Layer 206 is transitional layer; its purpose is to improve the "compatibility" between shield layer 204 and structural layer 208.

Regarding layer "compatibility," two important considerations are (1) the degree to which the layers tend to adhere to one another and (2) the response of the layers to changing thermal conditions. In particular, as a function of their composition, shield layer 204 and structural layer 208 might not adhere well to one another. In such embodiments, a material that improves the adhesion between the shield layer and the structural layer is used as layer 206.

As to consideration (2), the thermal expansion coefficients of shield layer 204 and structural layer 208 might differ substantially. As such, these layers will expand or contract by differing amounts in response to temperature changes. If bonded directly to one another, substantial internal stresses would be generated in these layers due to their differing thermal responses. In such embodiments, layer 206 is interposed between the structural and shield layers to reduce internal stresses that will arise.

Generally, layer 206 comprises a material that addresses both of the considerations raised. One class of materials suitable for this purpose is high-elongation film adhesives, such as epoxy, phenolic, bismaleimide, or polyimide. Transitional layer 206 is to be considered optional; its presence is dependent upon the specific materials that are used for shield layer 204 and structural layer 208.

Structural layer 208 comprises the bulk of tube 100. In some embodiments, structural layer 208 is made from a composite material. As used herein, the term "composite" means a heterogeneous combination of two or more constituents that differ in form or composition on a macroscopic scale. The combination of the constituents results in a material that maximizes specific performance characteristics. The constituents do not dissolve or merge completely; rather, they retain their physical and chemical identities. Yet, the composite exhibits characteristics that neither constituent alone possesses.

Composites typically include a reinforcing agent and a matrix. Composites are usually classified based on their matrix: polymer, metallic or ceramic, all of which are suitable for use in conjunction with the present invention. For the tubes disclosed herein, the reinforcing agent will typically be a fiber, but that is not necessary. The properties and characteristics of a fiber composite are dependent upon the specifics of the fiber and the resin matrix as well as the method by which they are processed into the composite.

Many types of materials can be used to form a composite for use as the structural layer 208. In fiber-reinforced composites, the fibers serve as the main load-carrying members and, in general, provide the structural performance (e.g., stiffness, strength, etc.) required for a tube being formed according the present method. Some important commercially available fibers suitable for use in conjunction with the current invention include, without limitation:

E-glass: good tensile strength, low tensile modulus, low cost.
S-glass: higher tensile strength, tensile modulus, and cost than E-glass.
Aramid: lower tensile strength than E-glass, higher tensile modulus than S-glass, high cost, very low density, excellent impact and damage tolerance, poor compression and shear strength.
Carbon/graphite: best tensile strength, higher modulus than Aramid, highest cost, intermediate density, poor impact and damage tolerance.

The resin matrix of the composite surrounds the fibers and keeps them in the desired location and orientation. The resin matrix also serves as a load-transfer medium between the fibers. A few suitable resin-matrix families suitable for use in conjunction with embodiments of the present invention include, without limitation:

General purpose polyester: orthophthalic polyesters, moderate strength and corrosion resistance, room temperature curing, lowest cost.
Improved polyester: isophthalic polyesters, good strength and corrosion resistance, room temperature curing, and slightly higher cost than GP polyester.
Epoxy: wide range of epoxy resins are available, best strength properties, good chemical resistance, elevated-temperature curing, relatively higher cost than Improved polyester.
Vinyl Ester: chemical combination of epoxy and polyester, excellent corrosion resistance, strength, and toughness properties, relatively higher cost.

The specific thickness of structural layer 208 is dictated by the physical and structural requirements of the particular application for the tube. Design considerations include, but are not limited to, radial and axial strength and stiffness, and physical interfaces with other hardware/components. It is expected that the thickness of structural layer 208 will be in a range of about 0.1 inches to about 1.0 inches.

Transitional layer 206 consists of one or more individual layers of material and is expected to have a thickness within a range of about 0.005 inches to about 0.02 inches. Design considerations include, without limitation, adhesive strength and elongation requirements. In some embodiments in which transitional layer 206 is a film adhesive, its thickness is driven by the thickness of the reinforcement material.

The thickness of shield layer 204 will be as required by the material type, manufacturing parameters, and end use requirements. Factors influencing the thickness of shield layer 204 include, but are not limited to, physical loading on the layer, duty cycle requirements, physical interfaces with other hardware/components, etc. Shield layer 204 is expected to have a thickness that is within a range about 0.01 inches to about 0.05 inches.

Figure 3:
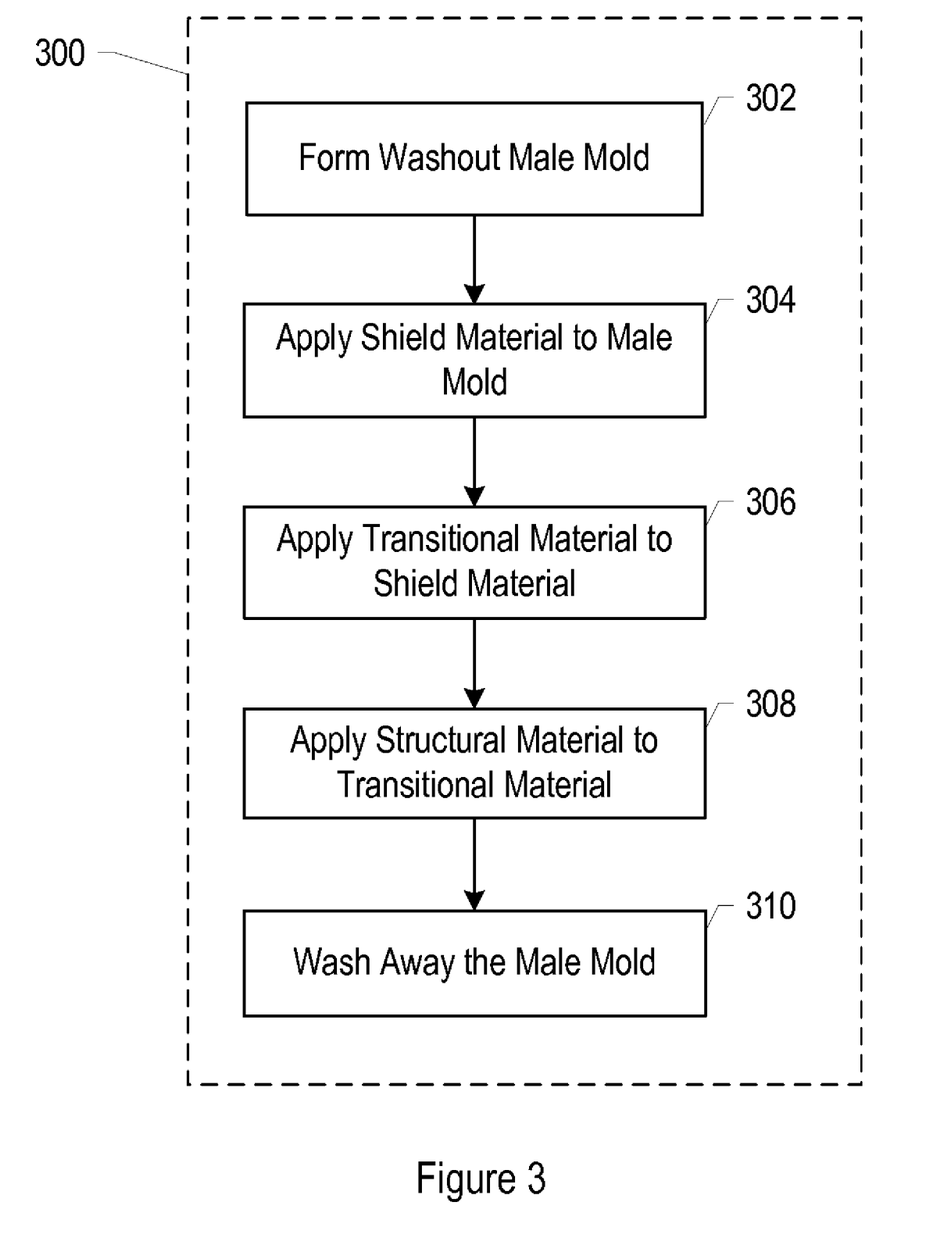
FIG. 3 depicts a method in accordance with the illustrative embodiment of present invention for forming the launch tube of FIG. 2.
Figure 4A:
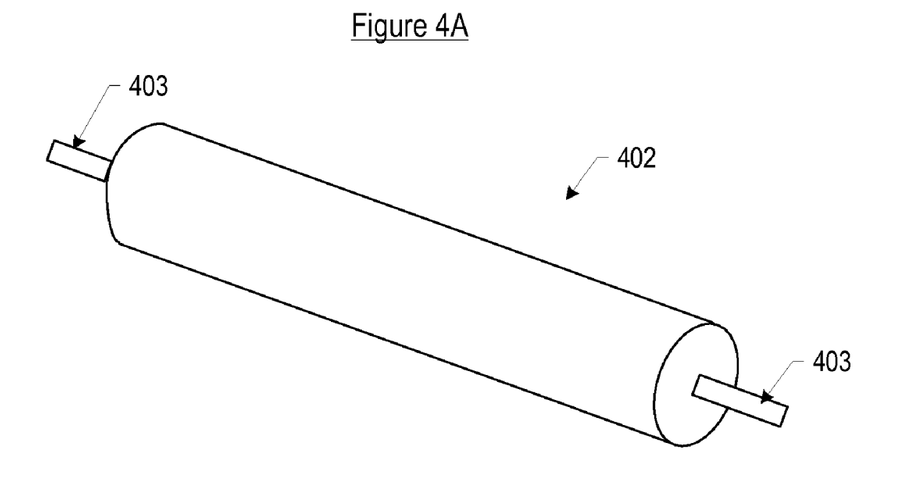
FIG. 4A depicts a wash-out mandrel for use in conjunction with the method of FIG. 3.

FIG. 3 depicts method 300 for forming a tube having a protective inner surface. According to operation 302 of method 300, a "wash-out" male mold, such as a wash-out mandrel, is formed. Wash-out mandrel 402 is depicted in FIG. 4A. Rods 403 are a part of a solid inner core about which the wash-out mandrel is formed. Rods 403 couple to a mechanism (e.g., filament winder, etc.) that rotates wash-out mandrel 402. The male-mold forming operation is described further below in conjunction with FIGS. 5A through 5C.

Figure 4B:
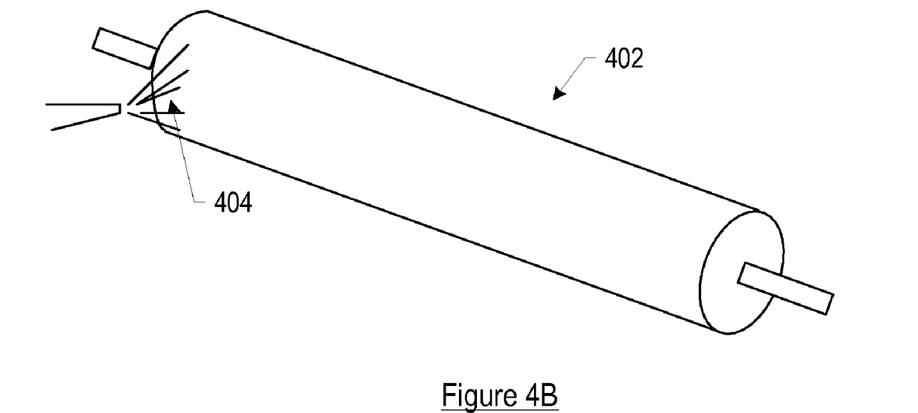
FIG. 4B depicts the application of a shield material to the wash-out mandrel of FIG. 4A.

In accordance with operation 304 of method 300, a material that forms shield layer 204 is applied to the male mold, such as via plasma or thermal spraying. The application of material 404 to wash-out mandrel 402 is depicted in FIG. 4B.

Figure 4C:
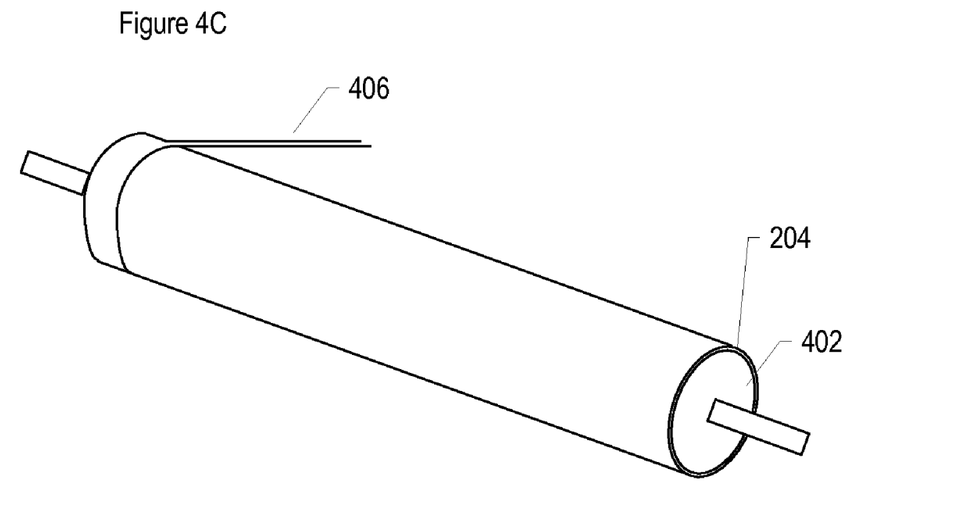
FIG. 4C depicts the application of a transitional layer to the shield layer that was formed in FIG. 4B.

Optional operation 306 is the application of the material that forms transitional layer 206. As depicted in FIG. 4C, material 406, which is depicted as a film adhesive, is wound onto shield layer 204. At the completion of this operation, wash-out mandrel 402 includes shield layer 204 and overlying transitional layer 206.

Figure 4D:
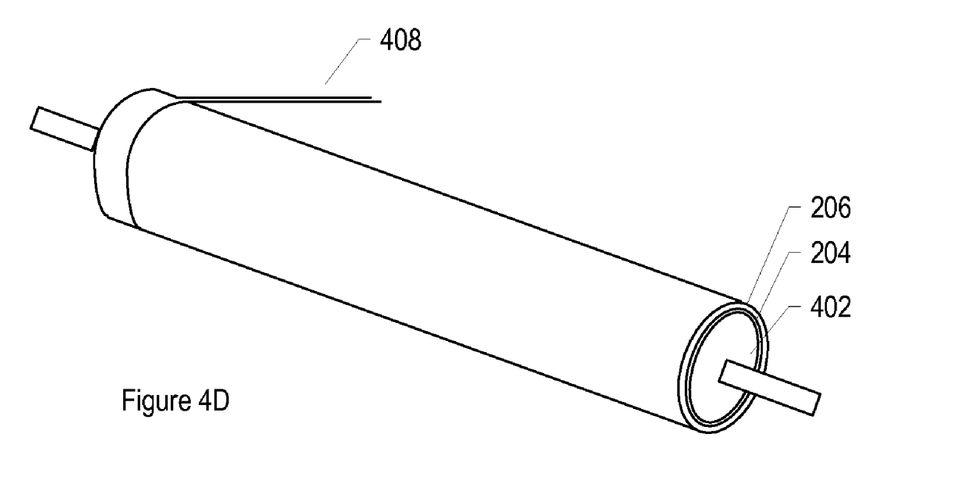
FIG. 4D depicts the application of a composite material to the transitional layer that was formed in FIG. 4C.

In operation 308, the composite material that forms structural layer 208 is applied to transitional layer 206 (if present) or directly to shield layer 204. FIG. 4D depicts filamentous composite material 408 being wound onto transitional layer 206. At the completion of this operation, structural layer 208, transitional layer 206, and shield layer 204 are disposed on wash-out mandrel 402.

Figure 4E:
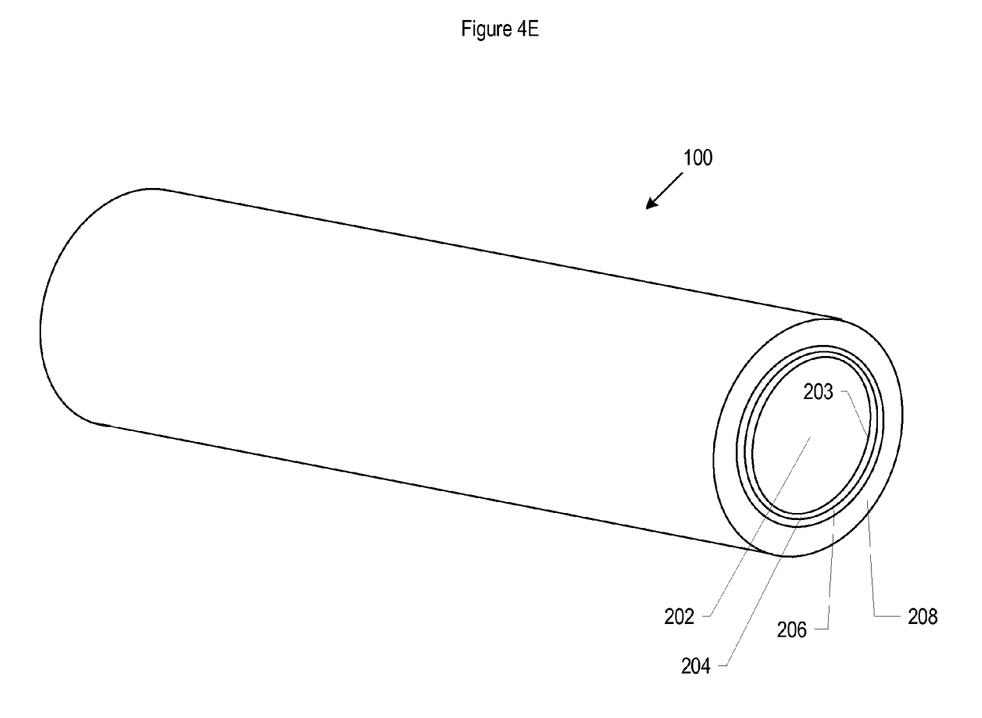
FIG. 4E depicts the composite tube that results after the wash-out mandrel is washed away.

In accordance with operation 310, the wash-out male mold is removed, such as by soaking in water. As depicted in FIG. 4E, this provides finished tube 100, having:
  bore 202, which is defined by surface 203 of shield layer 204;
  transitional layer 206, which overlies shield layer 204; and
  structural layer 208, which overlies transitional layer 206.

Figure 5:
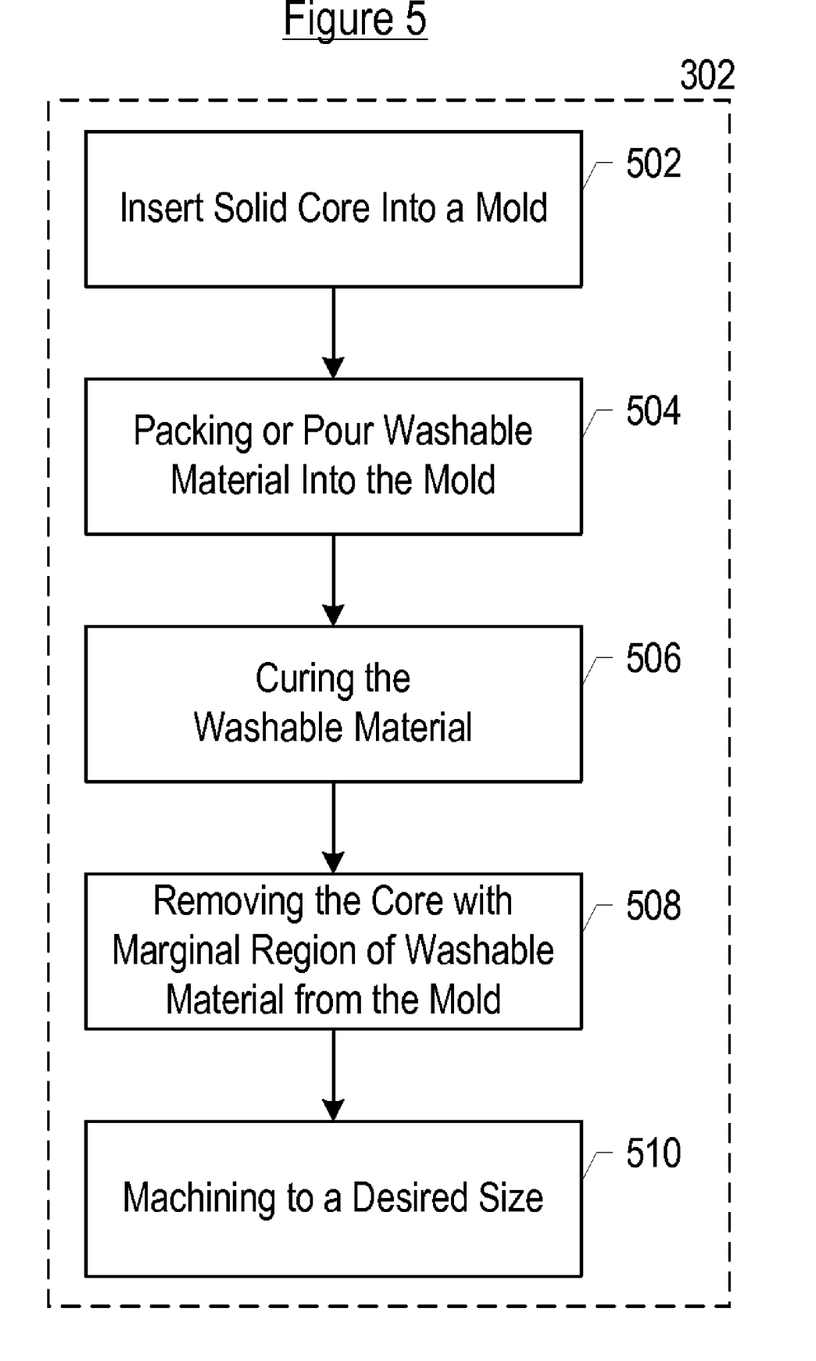
FIG. 5 depicts a method for forming a wash-out male mold, such as a wash-out mandrel, for use in conjunction with the method shown in FIG. 3.

Further description of operation 302—forming the wash-out male mold—is now provided in conjunction with FIG. 5.

It is notable that only the surface layer of the male mold needs to be "washed away" to effect release from shield layer 204, thereby forming bore 202. As a consequence, the male mold is a "partial" wash-out mold in the sense that it typically has a solid (e.g., metallic, etc.) core that is surrounded by an annular region of washable material. This is accomplished, as per the method depicted in FIG. 5, by inserting a solid core into a mold (operation 502), pouring or packing washable material in the region between the core and the mold (operation 504), curing the material (operation 506), removing the cured material and solid core (operation 508), and then appropriately machining the (washable portion of the) male mold (operation 510) to the desired diameter. The bore of the tube that is formed from this male mold is dictated, of course, by the outside diameter of the male mold.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed:

1. A launch tube having an axially-aligned bore, wherein said launch tube comprises:
    (a) a structural layer, wherein said structural layer comprises a filamentous composite material; and
    (b) a shield layer, wherein said shield layer:
        (i) is proximal to said bore;
        (ii) has greater durability than said structural layer, wherein durability is defined as at least one characteristic selected from the group consisting of chemical resistance, thermal resistance, and wear resistance; and
        (iii) is not a coating on said structural layer.

2. The launch tube of claim 1 wherein said shield layer comprises a material selected from the group consisting of metal, metallic alloy, and ceramic.

3. The launch tube of claim 1 wherein a diameter of said bore is twenty-four inches or less.

4. The launch tube of claim 1 wherein a diameter of said bore is eighteen inches or less.

5. The launch tube of claim 1 wherein a diameter of said bore is twelve inches or less.

6. The launch tube of claim 1 wherein a diameter of said bore is six inches or less.

7. The launch tube of claim 1, further comprising a transitional layer for improving adhesion between the shield layer and the structural layer.

8. The launch tube of claim 1, further comprising a transitional layer for reducing stresses that arise between the shield layer and the structural layer.

9. The launch tube of claim 1, further comprising a transitional layer that reduces any negative impact on the integrity of the launch tube that arises from a difference in at least a first property of the shield layer and a first property of the structural layer.

10. The launch tube of claim 9 wherein the transitional layer is disposed between the shield layer and the structural layer.

11. The launch tube of claim 10 wherein the transitional layer is a high-elongation film adhesive.

12. The launch tube of claim 10 wherein the transitional layer is selected from the group consisting of epoxy, phenolic, bismaleimide, and polyimide.

13. A launch tube having an axially-aligned bore, wherein said launch tube comprises:
    a coating-free tube having at least two layers, wherein:
    (a) a first of the two layers is a structural layer, wherein said structural layer comprises a composite material; and
    (b) a second of the two layers is a shield layer, wherein said shield layer:
        (i) is proximal to said bore; and
        (ii) has greater durability than said structural layer, wherein durability is defined as at least one characteristic selected from the group consisting of chemical resistance, thermal resistance, and wear resistance.

14. The launch tube of claim 13 wherein said shield layer comprises a material selected from the group consisting of metal, metallic alloy, and ceramic.

15. The launch tube of claim 13 wherein a diameter of said bore is twenty-four inches or less.

16. The launch tube of claim 13 wherein a diameter of said bore is eighteen inches or less.

17. The launch tube of claim 13 wherein a diameter of said bore is twelve inches or less.

18. The launch tube of claim 13 wherein a diameter of said bore is six inches or less.

19. The launch tube of claim 13 wherein the structural layer comprises a filamentous composite.

20. A launch tube having an axially-aligned bore, wherein said launch tube comprises:
- (a) a structural layer, wherein said structural layer comprises a composite material;
- (b) a shield layer, wherein said shield layer:
  - (i) is proximal to said bore;
  - (ii) has greater durability than said structural layer, wherein durability is defined as at least one characteristic selected from the group consisting of chemical resistance, thermal resistance, and wear resistance; and
  - (iii) is not a coating on said structural layer; and
- (c) a transitional layer that is disposed between the shield layer and the structural layer, wherein the transitional layer provides at least one of the following functions:
  - (i) improves adhesion between the shield layer and the structural layer, or
  - (ii) decreases stresses between the shield layer and the structural layer that results from differences in the thermal expansion coefficients of the shield layer and the structural layer.

* * * * *

UNITED STATES PATENT AND TRADEMARK OFFICE
CERTIFICATE OF CORRECTION

PATENT NO. : 7,651,750 B2  Page 1 of 1
APPLICATION NO. : 11/380623
DATED : January 26, 2010
INVENTOR(S) : Mark R. Alberding It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 893 days.

Signed and Sealed this

Twenty-third Day of November, 2010

David J. Kappos
*Director of the United States Patent and Trademark Office*